United States Patent [19]
Takahashi et al.

[11] Patent Number: 5,587,836
[45] Date of Patent: Dec. 24, 1996

[54] VISUAL DISPLAY APPARATUS

[75] Inventors: Koichi Takahashi, Hachioji; Takayoshi Togino, Koganei, both of Japan

[73] Assignee: Olympus Optical Co., Ltd., Tokyo, Japan

[21] Appl. No.: 242,630

[22] Filed: May 13, 1994

[30]   Foreign Application Priority Data

May 13, 1993 [JP] Japan .................... 5-111561

[51] Int. Cl.$^6$ .................... G02B 27/14; G02B 27/12
[52] U.S. Cl. .................... 359/630; 359/631; 359/640
[58] Field of Search .................... 359/630, 631, 359/636, 640, 629

[56]   References Cited

U.S. PATENT DOCUMENTS

| | | | |
|---|---|---|---|
| 3,840,289 | 10/1974 | Day | 359/630 |
| 4,026,641 | 5/1977 | Bosserman et al. | 359/884 |
| 4,664,486 | 5/1987 | Landre | 359/80 |
| 4,744,642 | 5/1988 | Yoshinaga | 359/379 |
| 4,961,626 | 10/1990 | Fournier, Jr. | 359/630 |
| 4,968,123 | 11/1990 | Fournier, Jr. | 359/630 |
| 4,969,714 | 11/1990 | Fournier, Jr. | 359/630 |
| 5,144,475 | 9/1992 | Hayashi | 359/355 |
| 5,182,671 | 1/1993 | Kitagishi | 359/557 |
| 5,299,063 | 3/1994 | Fritz | 359/630 |
| 5,384,654 | 1/1995 | Iba | 359/630 |

*Primary Examiner*—Georgia Y. Epps
*Assistant Examiner*—Ricky Mack
*Attorney, Agent, or Firm*—Cushman, Darby & Cushman IP Group of Pillsbury Madison & Sutro LLP

[57]   ABSTRACT

A visual display apparatus which enables the view angle for observation to be changed between two different levels with a simple arrangement by the observer's intention or according to the kind of image reproduced. The visual display apparatus has a device (5) for displaying an image, a relay optical system (4) for projecting the image displayed on the image display device (5) to form a first image, and an ocular optical system (2) for projecting the first image in an observer's eyeball. The relay optical system (4) has an optical system ($4_2$) which is movable along an optical axis and enables a magnification to be changed between two different levels by moving the movable optical system ($4_2$) along the optical axis. When one of magnifications of the movable optical system ($4_2$) is assumed to be $\beta$, the other magnification is approximately $1/\beta$.

12 Claims, 12 Drawing Sheets

Lateral aberration

VISUAL DISPLAY APPARATUS

BACKGROUND OF THE INVENTION

The present invention relates to a portable visual display apparatus and, more particularly, to a head- or face- mounted visual display apparatus that can be retained on the observer's head or face.

A head-mounted visual display apparatus such as that shown in the plan view of FIG. 12 has heretofore been known (see U.S. Pat. No. 4,026,641). In this conventional head-mounted visual display apparatus, an image of an image display device 46, e.g., a CRT, is transferred to an object surface 12 by an image transfer device 25, and the image transferred to the object surface 12 is projected in the air by a toric reflector 10.

Incidentally, each individual observer has a particular preference for the apparent size (view angle for observation) of an observation image presented to him or her by a head-mounted visual display apparatus. In other words, each individual observer has his/her particular view angle suitable for watching the observation image with ease. Further, the optimal view angle for observation varies according to the kind of image for observation, that is, the kind of information displayed.

For example, in the case of an image displayed on a display screen of a computer, it is necessary to recognize small characters, but on the other hand, it is not always necessary to look at the whole screen at a time. Therefore, it is preferable to view a large screen image even if the user must move his/her eyeballs to a considerable extent in order to see every corner of the screen image because of a large view angle. On the other hand, in the case of an image for enjoyment, e.g., a piece of scenery, close observation is not needed, while it is preferable to view the whole screen image without moving the eyeballs.

Thus, if the view angle of an observation image can be varied according to the object of observation, it is possible to observe a small object selectively and clearly and also possible to enjoy comfortable viewing of images for a long time without fatigue.

However, a zoom lens optical system, which is generally used as a magnification varying mechanism, has a complicated mechanism for a magnification change and needs a large-sized and heavy zoom cam mechanism for moving many lens elements for each lens unit. Accordingly, the use of such a zoom lens optical system results in an increase in the overall weight of the apparatus and also a rise in the cost.

SUMMARY OF THE INVENTION

In view of the above-described problems of the prior art, it is an object of the present invention to provide a visual display apparatus which enables the view angle for observation to be changed between two different levels with a simple arrangement by the observer's intention or according to the kind of image reproduced.

To attain the above-described object, the present invention provides a visual display apparatus having a device for displaying an image, a relay optical system for projecting the image displayed on the image display device to form a first image, and an ocular optical system for forming an exit pupil for protecting the first image in an observer's eyeball, wherein a change of magnification is effected by movement of the relay optical system along an optical axis.

In addition, the present invention provides a visual display apparatus having a device for displaying an image, a relay optical system for projecting the image displayed on the image display device to form a first image, and an ocular optical system for forming an exit pupil for projecting the first image in an observer's eyeball, wherein the relay optical system has a plurality of lens units, and a change of magnification is effected by moving at least one of the lens units along an optical axis.

In addition, the present invention provides a visual display apparatus including a face-mounted unit which has a device for displaying an image, a relay optical system for projecting the image displayed on the image display device to form a first image, and an ocular optical system for forming an exit pupil for projecting the first image in an observer's eyeball, and a support member for retaining the face-mounted unit on the observer's head, wherein the relay optical system has a movable liens unit and a fixed lens unit, and a change of magnification is effected by movement of the movable lens unit along an optical axis.

In addition, the present invention provides a visual display apparatus having a device for displaying an image, a relay optical system for projecting the image displayed on the image display device to form a first image, and an ocular optical system for projecting the first image in an observer's eyeball, wherein the relay optical system has an optical system which is movable along an optical axis and enables the magnification to be changed between two different levels by moving the movable optical system, and wherein when one of the magnifications of the movable optical system is assumed to be $\beta$, the other magnification is approximately $1/\beta$.

In these visual display apparatuses, the image display device preferably includes a pair of image display devices for the observer's right and left eyes. The relay optical system preferably includes a pair of relay optical systems for the observer's right and left eyes. The ocular optical system preferably includes a pair of ocular optical systems for the observer's right and left eyes. In this case, it is preferable for the pair of relay optical systems for the observer's right and left eyes to move along respective optical axes in association with each other when a change of magnification is effected.

In the visual display apparatus which enables the magnification to be changed between two different levels, the relay optical system preferably has an optical member of positive power which satisfies the following condition:

$$1.1 < R < 2.25$$

where R is the ratio of two magnifications which are changeable from one to the other by movement of the relay optical system; $R = \beta_1/\beta_2$, where $\beta_1$ is a higher magnification, and $\beta_2$ is a lower magnification.

In the above-described visual display apparatuses, it is preferable to satisfy the following conditions:

$$0.2 < f_t/L_r < 0.6$$

$$0.1 < \Delta L/L_r < 0.4$$

where $L_r$ is the optical path length of the relay optical system, $\Delta L$ is the amount of movement of the relay optical system for effecting a change of magnification, and $f_t$ is the focal length of the relay optical system that moves to effect a magnification change.

The relay optical system preferably has at least a cemented lens which satisfies the following condition:

$v_{I-vII} > 20$ where $v_I$ and $v_{II}$ are the Abbe's numbers of the lens elements constituting the cemented lens.

The ocular optical system may have an optical element selected from among a prism having a cemented surface, a magnifying optical system, and a concave mirror.

The reason for adopting the above-described arrangements in the present invention and the functions thereof will be explained below.

In the present invention, the projection magnification with which an observation image is projected to form a first image can be appropriately set by moving the movable optical system (hereinafter referred to as "magnification varying lens unit") so that one magnification thereof is $\beta$, and the other magnification thereof is approximately $1/\beta$. In other words, it is possible to realize an observation view angle varying device with an extremely simple structure.

It is essential that the relay optical system should be arranged to have at least one positive refractive power, and that the image display device that displays an image for observation and the relay optical system, which has at least one positive refractive power, for projecting the image displayed on the image display device should satisfy the following condition:

$$1.1 < R < 2.25 \qquad (1)$$

where R is the ratio between two magnifications of the magnification varying lens unit of the relay optical system which are changeable from one to the other by the magnification varying function, $R = \beta_1/\beta_2$, where $\beta_1$ is a higher magnification, and $\beta_2$ is a lower magnification.

According to the present invention, the magnification varying function of the relay optical system is realized by a simple mechanism in which at least one optical system in the relay optical system merely moves along the optical axis. Accordingly, if it is intended to obtain a high variable magnification ratio exceeding the upper limit of the condition (1), the amount of movement of the magnification varying lens unit becomes exceedingly large, making it impossible to arrange the apparatus in a compact form. In addition, if the magnification ratio becomes excessively high, it becomes impossible to sufficiently correct aberrations produced at each magnification. Conversely, if the lower limit of the condition (1) is not reached, the variable magnification ratio becomes excessively low, causing the effect of the variable magnification function to be reduced.

Next, it is preferable to satisfy the following conditions:

$$0.2 < f_i/L_r < 0.6 \qquad (2)$$

$$0.1 < \Delta L/L_r < 0.4 \qquad (3)$$

where $L_r$ is the optical path length of the relay optical system, $\Delta L$ is the amount of movement of the magnification varying lens unit, and $f_i$ is the focal length of the magnification varying lens unit.

The condition (2) defines the focal length of the optical system (i.e. the magnification varying lens unit) that moves to effect a magnification change. If the upper limit of the condition (2) is exceeded, the focal length of the moving optical system becomes excessively long relative to the entire optical path length of the relay optical system. In other words, the refractive power becomes excessively small. Therefore, no satisfactory high variable magnification ratio can be obtained. Conversely, if the lower limit of the condition (2) is not reached, the focal length of the moving optical system becomes short. That is, the refractive power becomes large, resulting in an increase in the amount of aberration produced in the moving optical system. Particularly, the negative field curvature produced in the relay optical system cannot satisfactorily be corrected.

The condition (3) defines the amount of movement of the optical system that moves to effect a magnification change. If the upper limit of the condition (3) is exceeded, the amount of movement of the optical system becomes excessively large, making it impossible to arrange the apparatus in a compact form. Conversely, if the lower limit of the condition (3) is not reached, no satisfactorily high variable magnification ratio can be obtained, so that the magnification varying function becomes useless.

The overall projection magnifications $\beta_{z1}$ and $\beta_{z2}$ of the relay optical system when an observation image is projected to form a first image are respectively given as coefficient multiples of the magnifications $\beta_1$ and $\beta_2$ of the magnification varying lens unit. For example, in a case where the relay optical system is composed of a 1-st lens unit, a 2-nd lens unit and a 3-rd lens unit in the mentioned order from the observation image side, if it is assumed that the magnification varying lens unit is comprised only of the 2-nd lens unit, that the magnifications $\beta_1$ and $\beta_2$ of the magnification varying lens unit are 1.25 and 0.8, respectively, and that the magnification of the fixed lens units other than the magnification varying lens unit, that is, the 1-st and 3-rd lens units, is 2, the overall projection magnifications $\beta_{z1}$ and $\beta_{z2}$ of the relay optical system are given by $$\beta_{z1} = \beta_1 \times 2 = 1.25 \times 2 = 2.5$$

$$\beta_{z2} = \beta_2 \times 2 = 0.8 \times 2 = 1.6$$

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

First to third examples of the visual display apparatus according to the present invention will be described below with reference to the accompanying drawings.

In each of the following examples, the relay optical system is composed of at least two lens units having positive refractive power. At least one of the lens units is comprised of a cemented lens. It is preferable to satisfy the following condition:

$$v_I - v_{II} > 20 \qquad (4)$$

where $v_I$ and $v_{II}$ are the Abbe's numbers of the lens elements constituting the cemented lens.

By satisfying the condition (4), a favorable image, which has been corrected for chromatic aberration, can be projected as a first image in a case where a color image is displayed by a two-dimensional display device.

FIRST EXAMPLE

Figure 1:
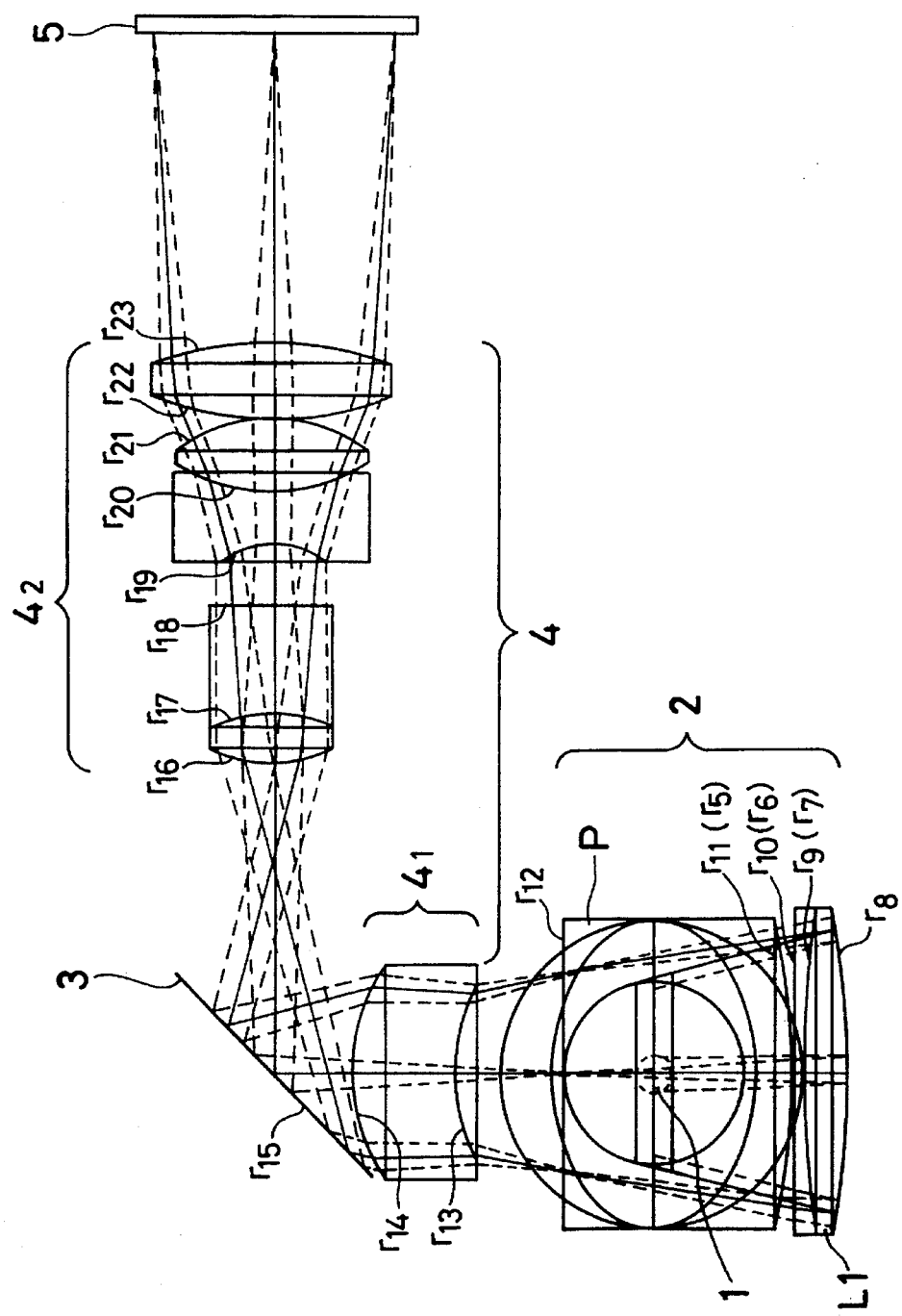
FIG. 1 shows the arrangement of an optical system in a first example of the visual display apparatus according to the present invention when the view angle for observation is 50°.
Figure 2:
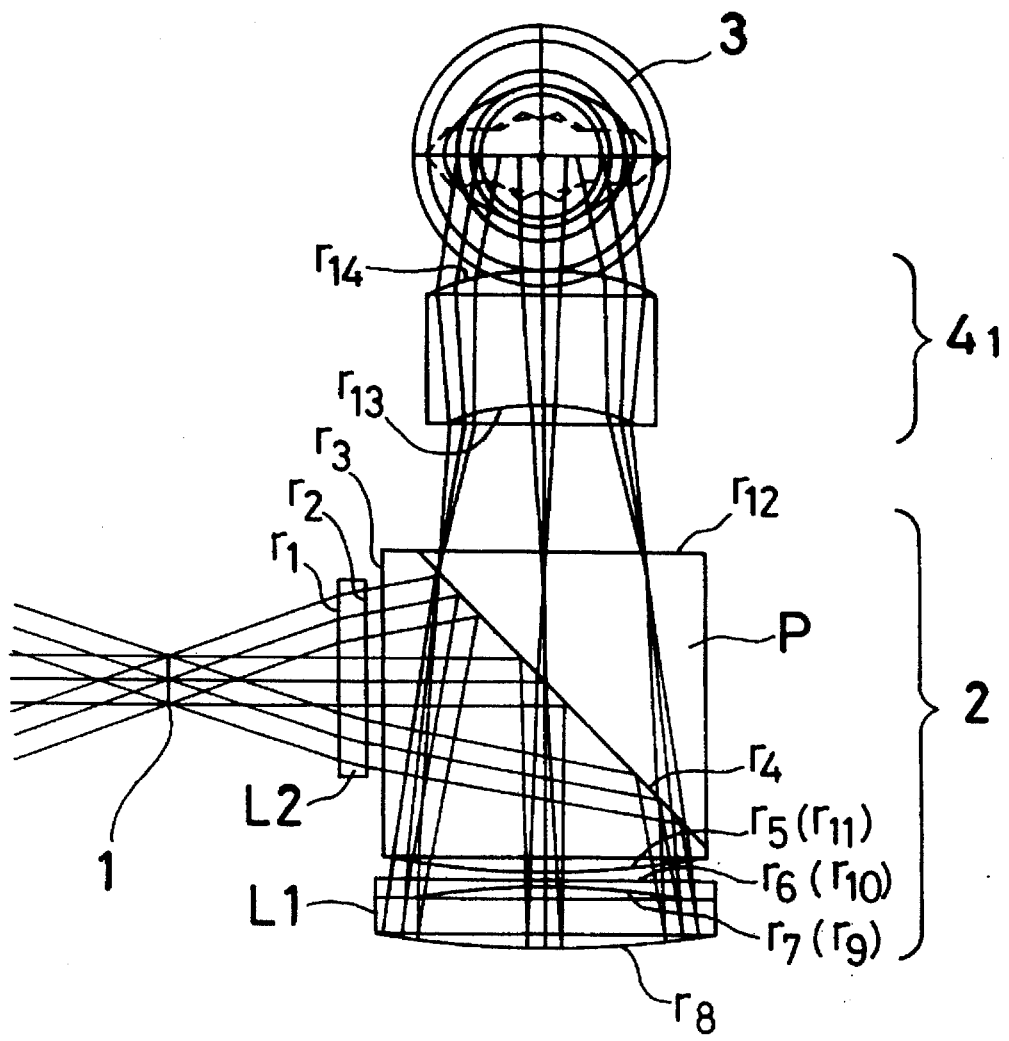
FIG. 2 shows the arrangement of an prism type ocular optical system in the first example of the visual display apparatus according to the present invention when the view angle for observation is 50°.

FIG. 1 shows the arrangement of an optical system of a first example of the visual display apparatus according to the present invention when the view angle for observation is 50°, as viewed from the observer side. FIG. 2 shows the arrangement of a prism type ocular optical system of the first example of the visual display apparatus according to the present invention when the view angle for observation is 50°. More specifically, FIG. 1 is a front view of an optical system fitted to the observer's right eye as viewed from the observer side. The visual axis extends from the obverse side to the reverse side of the plane of the figure. FIG. 2 is a side view of the optical system shown in FIG. 1 as viewed from the right-hand side thereof.

In FIGS. 1 and 2, reference numeral 1 denotes an observer's pupil position, 2 a prism type ocular optical system, 3 a reflecting mirror, and 4 a relay optical system. The relay optical system 4 includes a lens unit $4_1$ which is closer to the pupil position 1 than the reflecting mirror 3, and a lens unit $4_2$ which is closer to a two-dimensional display device 5 than the reflecting mirror 3.

The relay optical system 4 has six lens elements divided into four groups which are arranged to relay an image displayed on the two-dimensional display device 5 and to form a first image in the vicinity of the object-side surface of the prism type ocular optical system 2. The lens unit $4_2$ of the relay optical system 4, which is disposed between the reflecting mirror 3 and the two-dimensional display device 5, is movable. Thus, by moving the lens unit $4_2$ along the optical axis, the projection magnification of the relay optical system 4 can be changed between two different levels without changing the object-image distance of the entire optical system. That is, it is possible to realize two image frame modes which are different in the view angle for observation, with an extremely simple arrangement.

The prism type ocular optical system 2 has on the object side thereof a cemented prism P having a beam splitter surface therein. The beam splitter surface is inclined at 45° with respect to a plane where the first image of the relay optical system 4 is projected. The beam splitter surface partially transmits and partially reflects light incident thereon. The surface of the cemented prism P that is opposite to the surface where the first image of the relay optical system 4 is projected has a curvature, and at the exit side of this surface a cemented lens L1 is disposed. The cemented lens L1 has a reflecting surface on the reverse side thereof, that is, the side thereof that is opposite to the prism-side surface of the cemented lens L1. In addition, a positive lens L2 is disposed on the eyeball side of the cemented prism P. The positive lens L2 lies immediately in front of the observer's eyeball.

With this arrangement, the first image formed by the relay optical system 4 can be projected in the air as an enlarged virtual image with an exit pupil formed at the observer's pupil position 1. Further, an outside world image can be observed through the cemented prism P lying in front of the observer's pupil 1.

Constituent parameters of this optical system will be shown later. It should be noted that the surface Nos. are shown as ordinal numbers in backward tracing from the exit pupil position, that is, the observer's pupil position 1, toward the two-dimensional display device 5, with the exit pupil position defined as surface No. 0. The two-dimensional display device 5 is given surface No. 24. The radii of curvature of the surfaces are denoted by $r_1$ to $r_{23}$ in order from the pupil-side surface of the positive lens L2 to the display device-side surface of the relay optical system 4, and the surface separations are denoted by $d_1$ to $d_{22}$. Further, the refractive indices of the vitreous materials for the spectral d-line are denoted by $n_1$ to $n_{14}$, and the Abbe's numbers are denoted by $v_1$ to $v_{14}$. In addition, the spacing between the pupil position 1 and the positive lens L2 is denoted by $d_0$, and the spacing between the relay optical system 4 and the two-dimensional display device 5 is denoted by $d_{23}$.

Figure 3:
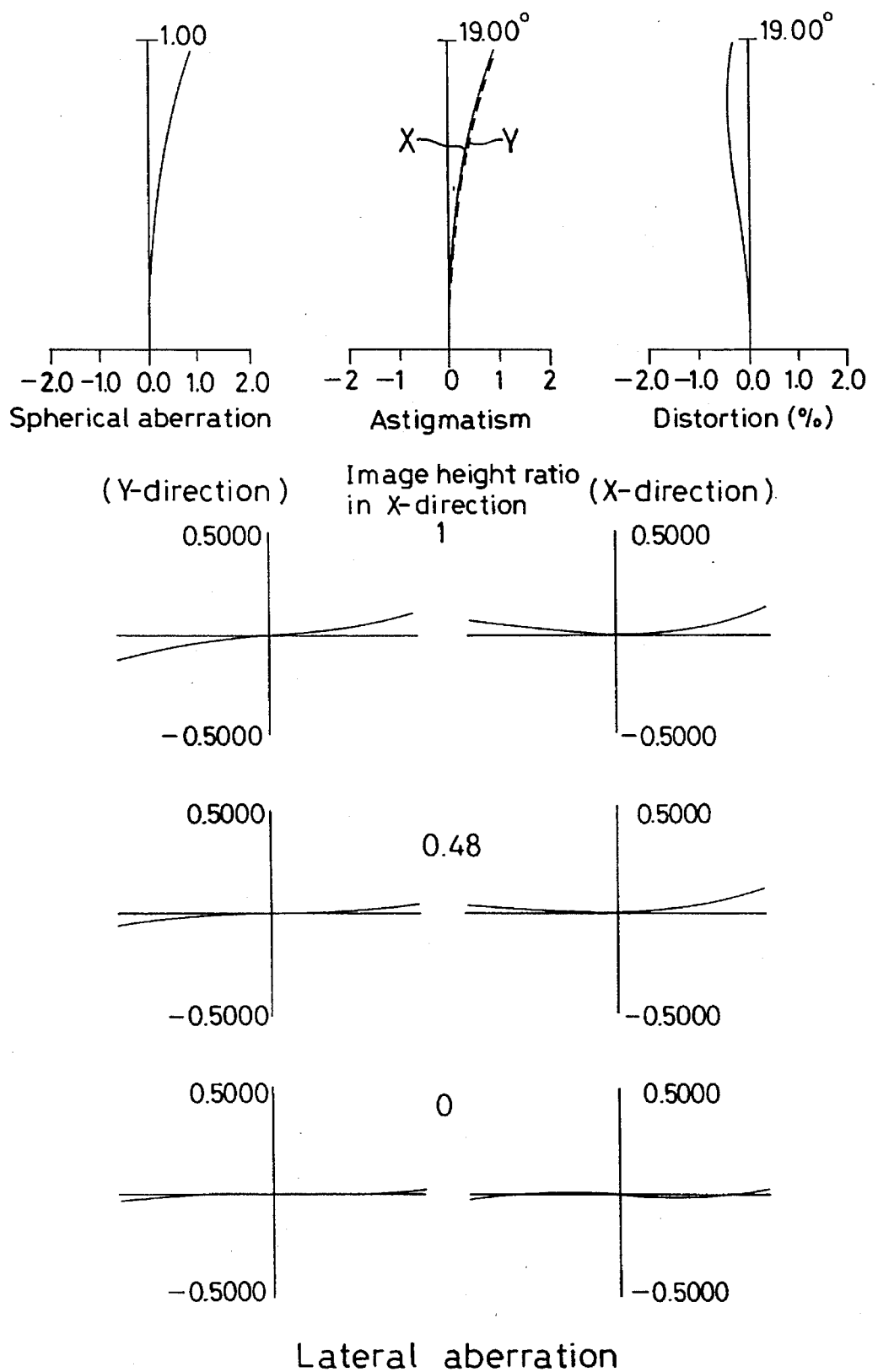
FIG. 3A graphically shows spherical aberration.
FIG. 3B shows astigmatism.
FIG. 3C shows distortion and FIG. 3D shows lateral aberration at a view angle of 50° in the first example of the visual display apparatus according to the present invention.
Figure 4:
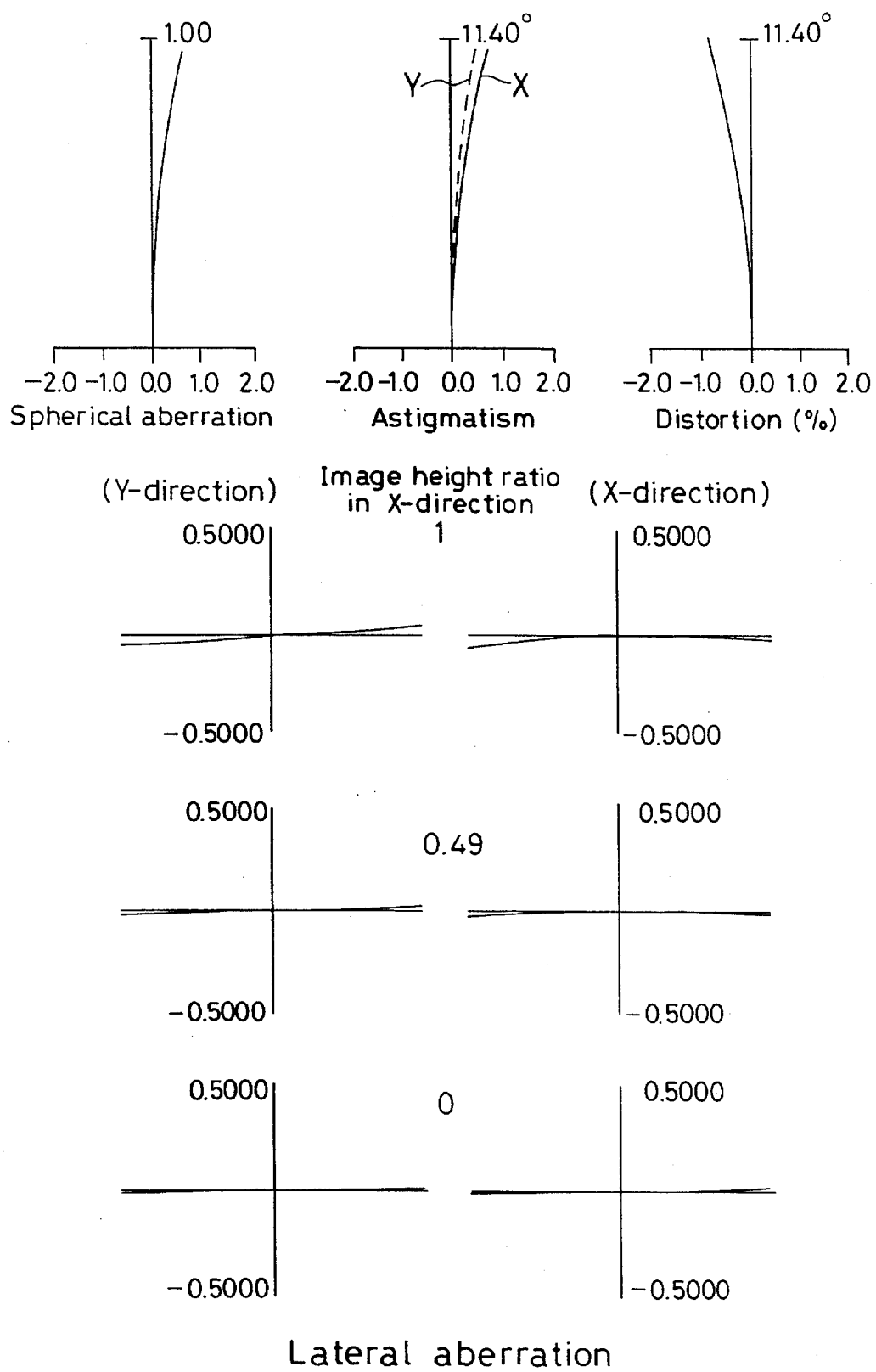
FIGS. 4A–4D graphically shows various aberrations at a view angle of 30° in the first example of the visual display apparatus according to the present invention in a similar manner to FIGS. 3A–3D.

In this example, the horizontal angle of view is 50°, while the vertical angle of view is 38°, and the pupil diameter is 4 mm. The magnification of the magnification varying lens unit $4_2$ is changed from $\beta_1=1.36$ to $\beta_2=0.75$ by moving the magnification varying lens unit $4_2$ so that the numerical values in the parentheses in the column of "surface separation" are attained. Thus, the view angle for observation can be changed over from 50° to 30°. FIG. 3 graphically shows spherical aberration, FIG. 3B shows astigmatism, FIG. 3C shows distortion and FIG. 3D shows lateral aberration at a view angle of 50° in the optical system having the above-described arrangement, and FIGS. 4A–4D graphically show various aberrations at a view angle of 30° in a similar manner to FIGS. 3A–3D. In these figures, X represents the vertical direction of the image frame, and Y the horizontal direction of the image frame.

The values in the above-described conditions are as follows:

$R=1.81$ $f/L_r=0.34$ $\Delta L/L_r = 0.20$ $\beta_{z1}=1.39$ $\beta_{z2}=0.77$ $v_f - v_{If}=27.6$

SECOND EXAMPLE

Figure 5:
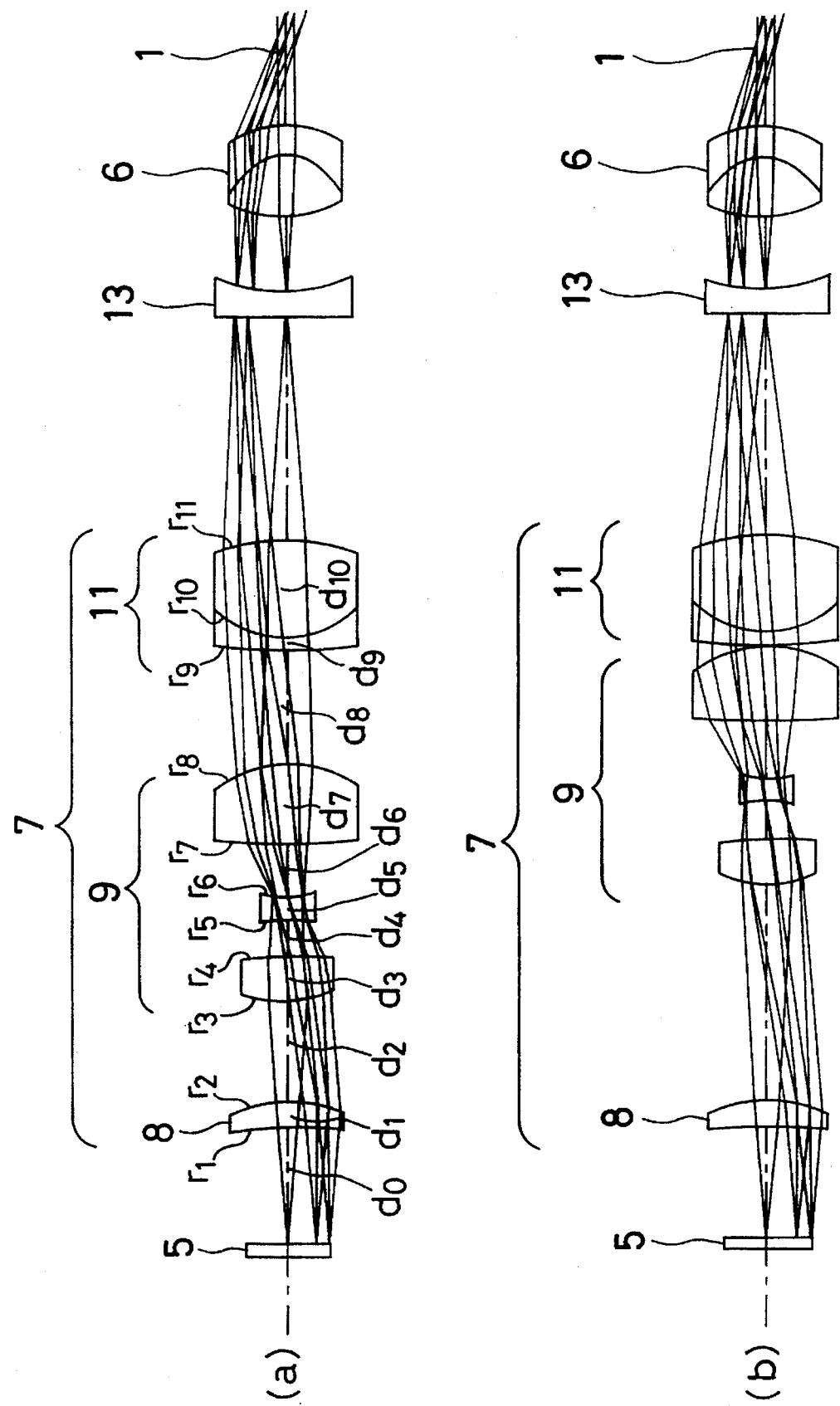
FIGS. 5(a) and 5(b) show the arrangement of an optical system in a second example of the visual display apparatus according to the present invention.

FIG. 5(a) shows the arrangement of an optical system of a second example of the visual display apparatus according to the present invention when the view angle for observation is 50° and FIG. 5(b) shows the optical system of the second example when the view angle for observation is 35°. In these figures, reference numeral 1 denotes an observer's pupil position, 6 an ocular optical system, 7 a relay optical system, 8 a 1-st lens unit in the relay optical system, 9 a 2-nd lens unit in the relay optical system, 11 a 3-rd lens unit in the relay optical system, 5 a two-dimensional display device, and 13 a fiber plate.

The relay optical system 7 in this example has six lens elements divided into three groups which are arranged to relay an image displayed on the two-dimensional display device 5 and to form a first image at a position corresponding to the front focal point of the ocular optical system 6. The projection magnification of the relay optical system 7 can be changed between two different levels by changing the position of the 2-nd lens unit 9 in the relay optical system 7 without changing the distance from the two-dimensional display device 5 to the first image surface formed by the relay optical system 7, that is, by moving as a magnification varying lens unit the 2-nd lens unit 9 lying between the 1-st and 3-rd lens units 8 and 11, which are respectively the remotest from and the closest to the image surface of the relay optical system 7, along the optical axis with the observer's pupil position 1, the two-dimensional display device 5 and the ocular optical system 6 fixed and without moving the 1-st and 3-rd lens units 8 and 11.

The ocular optical system 6 may adopt any type of lens arrangement, provided that the first image formed by the relay optical system 7 can be projected in the air as an enlarged virtual image with an exit pupil formed at the observer's pupil position 1. In this example, the ocular optical system 6 is of the magnifier type which is comprised of a single cemented lens. Optical evaluation by the backward tracing from the pupil reveals that this ocular optical system has a considerably large curvature of field. Accordingly, a simple combination with the relay optical system 7 will degrade the off-axis image forming performance in the entire optical system. Therefore, it is necessary to match the first image with the curved object surface of the ocular optical system 6. For this reason, the fiber plate 13 is disposed on the first image surface, in which one of the image transmitting surfaces is flat, and the other surface is formed with the same curvature as that of the field curvature produced by the ocular optical system 6, thereby enabling observation of an image which is flat entirely from the axial region to the off-axis region.

With the above-described arrangement of the optical system, the first image formed by the relay optical system 7 can be projected in the air as an enlarged virtual image with an exit pupil formed at the observer's pupil position 1, and it is possible to realize two image frame modes which are different in the view angle for observation.

In this example, if the ocular optical system 6 has no field curvature, the fiber plate 13 need not be used. In such a case, the first image of the relay optical system 7 may be used as it is.

Constituent parameters of this optical system will be shown later. In this example, however, the parameters of the relay optical system 7 alone are shown, but the other parameters are omitted. The ray tracing is carried out in the direction of actual rays emitted from the two-dimensional display device 5 toward the exit pupil. With regard to the surface No., the two-dimensional display device 5 is given surface No. 0, and the first image of the relay optical system 7 is given surface No. 12. The radii of curvature of the surfaces are denoted by $r_1$ to $r_{11}$ in order from the entrance-side surface of the 1-st lens unit 8 to the exit-side surface of the 3-rd lens unit 11, and the surface separations are denoted by $d_1$ to $d_{10}$. Further, the refractive indices of the vitreous materials for the spectral d-line are denoted by $n_1$ to $n_6$, and the Abbe's numbers are denoted by $v_1$ to $v_6$. In addition, the spacing between the two-dimensional display device 5 and the 1-st lens unit 8 is denoted by $d_0$, and the spacing between the relay optical system 7 and the first image is denoted by $d_{11}$.

In this example, the object side of the relay optical system 7 is arranged as a telecentric optical system, and the first image side also has an approximately telecentric arrangement. Therefore, the quantity of light is uniform all over the image frame, and it is possible to observe an even more favorable image of high contrast.

The optical system including the relay optical system 7, together with the above-described fiber plate 13 and the ocular optical system 6, can realize a horizontal view angle of 50°, a vertical view angle of 38°, and a pupil diameter of 4 mm. The magnification of the magnification varying lens unit is changed from $\beta_1=1.20$ to $\beta_2=0.84$ by moving the 2-nd lens unit 9 of the relay optical system 7 so that the numerical values in the parentheses in the column of "surface separation" are attained. Thus, the view angle for observation can be changed over from 50° to 35°.

Figure 6:
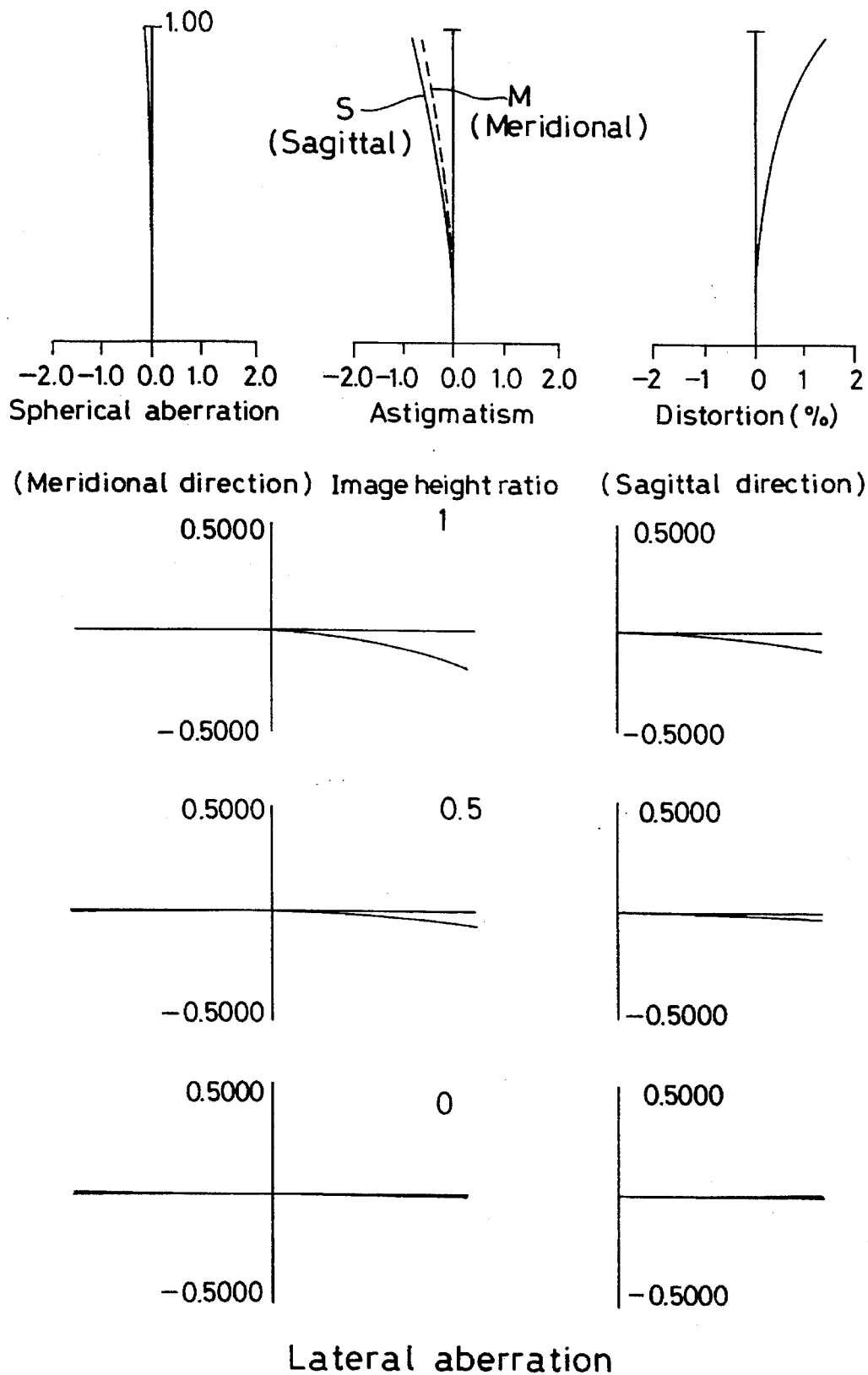
FIG. 6A graphically shows spherical aberration.
FIG. 6B shows astigmatism.
FIG. 6C shows distortion and FIG. 6D shows lateral aberration in a relay optical system of the second example when the magnification $\beta_1$ of a magnification varying optical system is 1.20.
Figure 7:
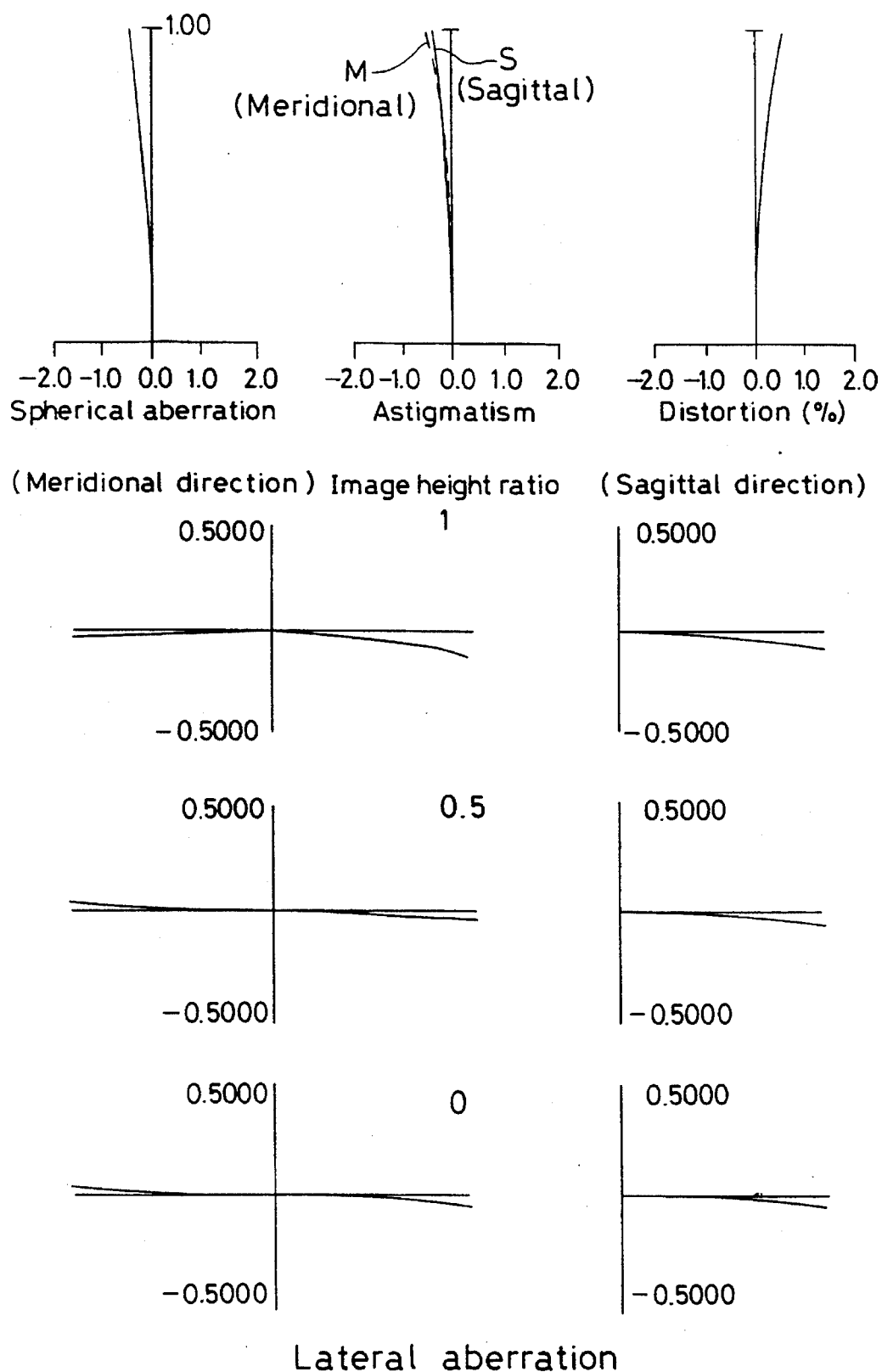
FIGS. 7A–7D graphically shows various aberrations in the relay optical system of the second example when the magnification $\beta_2$ of the magnification varying optical system is 0.84 in a similar manner to FIGS. 6A–6D.

FIG. 6A graphically shows spherical aberration, FIG. 6B shows astigmatism, FIG. 6C shows distortion and FIG. 6D shows lateral aberration in the relay optical system 7 when the magnification $\beta_1$ of the magnification varying optical system having the above-described arrangement is 1.20, and FIGS. 7A–7D graphically show various aberrations in the relay optical system 7 when the magnification $\beta_2$ is 0.84 in a similar manner to FIGS. 6A–6D.

The values in the above-described conditions are as follows:

$R=1.43$ $f/L_r=0.49$ $\Delta L/L_r = 0.18$ $\beta_{z1} = 1.18$ $\beta_{z2} = 0.82$ $v_I - v_{II} = 29.6$

THIRD EXAMPLE

Figure 8:
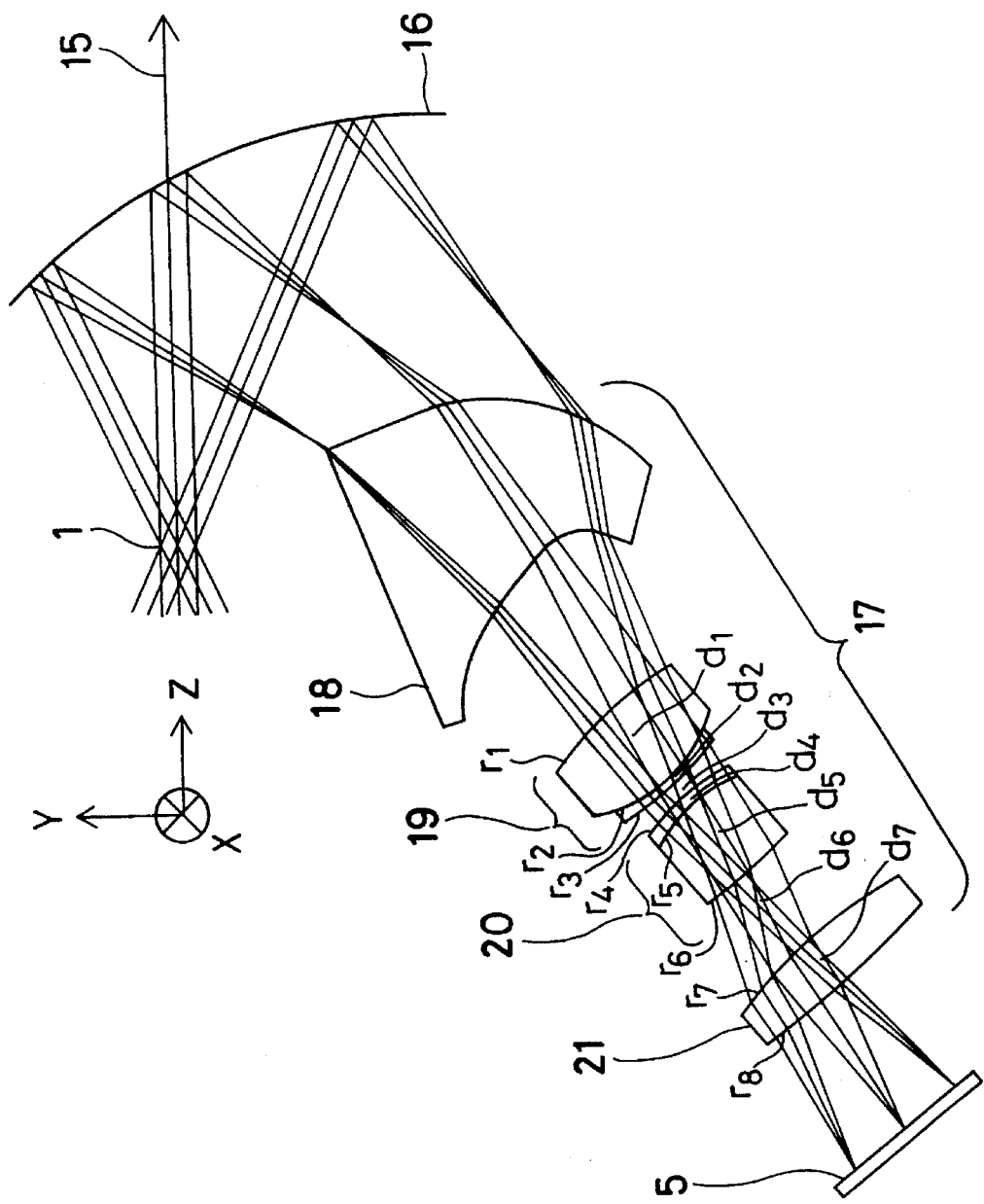
FIG. 8 shows the arrangement of an optical system in a third example of the visual display apparatus according to the present invention when the view angle for observation is 50°.
Figure 9:
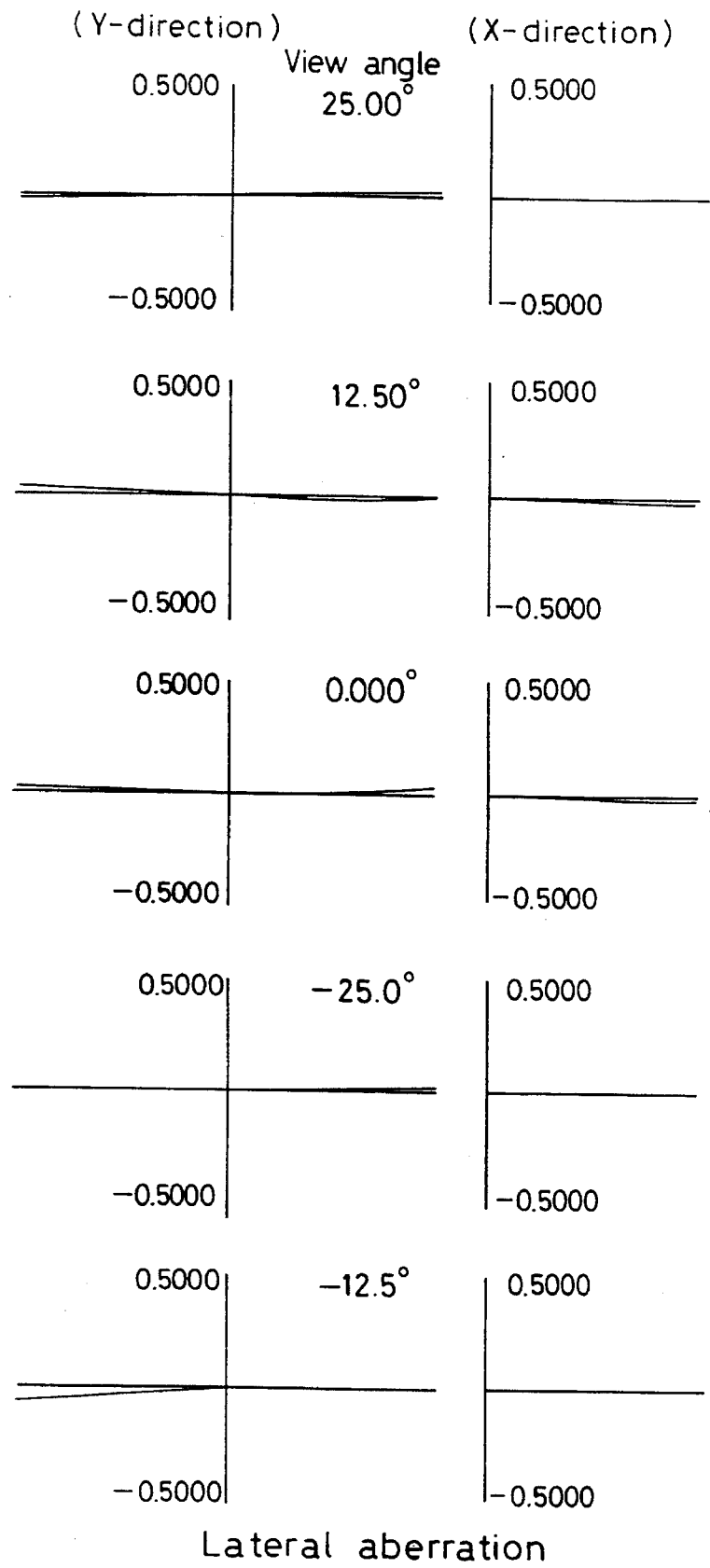
FIGS. 9A–9E graphically show lateral aberration at a view angle of 50° in the third example of the visual display apparatus according to the present invention.
Figure 10:
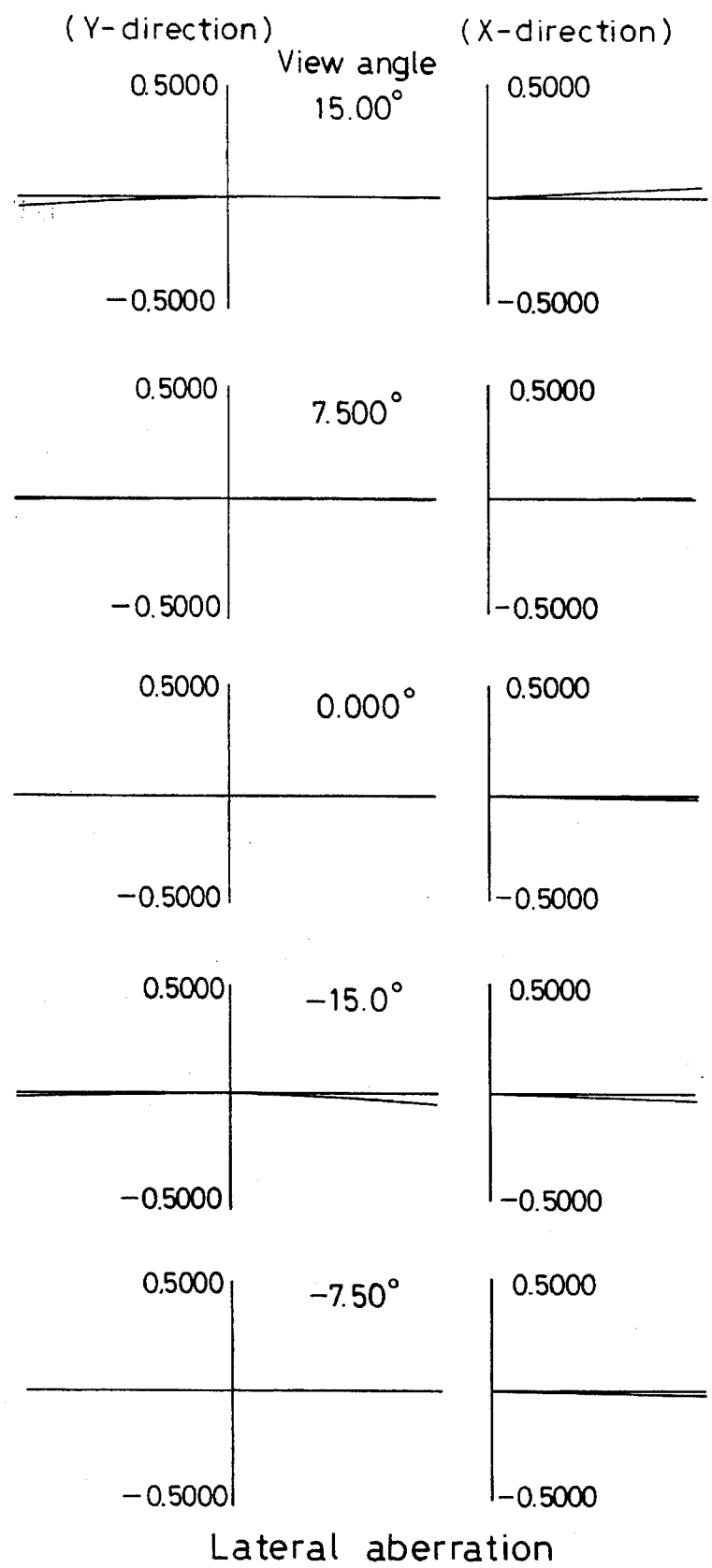
FIGS. 10A–10E graphically show lateral aberration at a view angle of 30° in the third example of the visual display apparatus according to the present invention in a similar manner to FIG. 9.

FIG. 8 shows the arrangement of an optical system for the observer's right eye in a third example of the visual display apparatus according the present invention when the view angle for observation is 50°, as viewed from above the observer's head. In the figure, reference numeral 1 denotes an observer's pupil position, 15 a visual axis lying when the observer sees forward, 16 an ocular optical system formed of a concave mirror, 17 a relay optical system, 18 a 1-st lens unit in the relay optical system 17, 19 a 2-nd lens unit in the relay optical system 17, 20 a 3-rd lens unit in the relay optical system 17, 21 a 4-th lens unit in the relay optical system 17, and 5 a two-dimensional display device.

A coordinate system is defined as illustrated in the figure. That is, the sideward (horizontal) direction of the observer is taken as the Y-axis, where the leftward direction is defined as the positive direction; the direction of the observer's visual axis 15 is taken as the Z-axis, where the direction toward the concave mirror 16 from the observer's eyeball is defined as the positive direction; and the vertical direction of the observer is taken as the X-axis, where the downward direction is defined as the positive direction.

The relay optical system 17 has six lens elements divided into four groups which are arranged to relay an image displayed on the two-dimensional display device 5 and to form a first image at a position corresponding to the front focal point of the ocular optical system 16. The projection magnification of the relay optical system 17 can be changed between two different levels by changing the positions of the 2-nd to 4-th lens units 19 to 21 in the relay optical system 17 without changing the distance from the two-dimensional display device 5 to the first image surface formed by the relay optical system 17, that is, by moving the 2-nd to 4-th lens units 19 to 21 along the optical axis as magnification varying lens units while fixing the observer's pupil position 1, the two-dimensional display device 5, the ocular optical system 16, and the 1-st lens unit 18 in the relay optical system 17 that is the closest to the image surface of the relay optical system 17.

Constituent parameters of this optical system will be shown later. It should be noted that the surface Nos. are shown as ordinal numbers in backward tracing from the exit pupil 1 toward the two-dimensional display device 5.

As to the amount of decentration (eccentricity) and the tilt angle (inclination angle) of each surface, the concave mirror 16 (surface No. 2) is given only an eccentricity in the Y-axis direction, which is a distance by which the vertex of the concave mirror 16 decenters in the Y-axis direction from the visual axis 15 (Z-axis) passing through the center of the exit pupil 1. The 1-st lens unit 18 of the relay optical system 17 is given both a decentration and a tilt for each surface thereof: that is, an eccentricity of the vertex of each of the surfaces (surface Nos. 3 and 4) from the center of the exit pupil 1 in each of the Y- and Z-axis positive directions, and an angle of inclination of the central axis passing through the vertex of each surface with respect to the Z-axis. The inclination angle of the central axis of each surface is given with the angle of rotation from the Z-axis positive direction toward the Y-axis positive direction (in the counterclockwise direction as viewed in the figure) defined as angle in the positive direction. Regarding the 2-nd lens unit 19 of the relay optical system 17, the vertex position of the 1-st surface (surface No. 5) thereof is given in the same way as in the case of each surface of the 1-st lens unit 18. A central axis that passes through the vertex of the 1-st surface (surface No. 5) is an optical axis, and the angle of inclination of this optical axis is given in the same way as the above. Surfaces (surface Nos. 6 to 12) without indication of eccentricity and inclination angle are each coaxial with respect to the preceding surface. The two-dimensional display device 5 is given both an eccentricity as a distance by which the center thereof shifts from the center of the exit pupil 1 in the Y- and Z-axis positive directions, and an angle of inclination of the normal to the surface thereof with respect to the Z-axis direction.

When the coordinate system is set as illustrated in the figure and the paraxial curvature radius of each surface in a plane perpendicular to the Y-Z plane (the plane of the figure) is $R_x$, while the paraxial curvature radius in the Y-Z plane is $R_y$, the aspherical configuration of each surface may be expressed by.

$$Z = [(X^2/R_x) + (Y^2/R_y)]/[1 + \{1 - (1 + K_x)(X^2/R_x^2) -$$
$$(1 + K_y)(Y^2/R_y^2)\}^{1/2}] + AR[(1 - AP)X^2 + (1 + AP)Y^2]^2 +$$
$$BR[(1 - BP)X^2 + (1 + BP)Y^2]^3 \ldots$$

where $K_x$ is the conical coefficient in the X-direction; $K_y$ is the conical coefficient in the Y-direction; AR and BR are rotationally symmetric 4th- and 6th-order aspherical coefficients, respectively; and AP and BP are asymmetric 4th- and 6th-order aspherical coefficients, respectively.

Regarding the surface separation, the spacing between the exit pupil 1 and the concave mirror 16 is shown as a distance in the Z-axis direction between the center of the exit pupil 1 and the vertex of the concave mirror 16, and the spacing between the 1-st surface (surface No. 5) of the 2-nd lens unit 19 in the relay optical system 17 and the image surface thereof (the two-dimensional display device 5) is shown as a distance along the optical axis thereof. As to the constituent elements in the 2-nd to 4-th lens units 19 to 21 in the relay optical system 17, the radii of curvature of the surfaces are denoted by $r_1$ to $r_8$, the surface separations by $d_1$ to $d_7$, the refractive indices for the spectral d-line by $n_1$ to $n_5$, and the Abbe's numbers by $v_1$ to $v_5$.

In this example, the horizontal (Y-direction) angle of view is 50°, while the vertical (X-direction) angle of view is 39°, and the pupil diameter is 4 mm.

In this example, the magnification of the magnification varying lens unit is changed from $\beta_1 = 1.4$ to $\beta_2 = 0.7$ by moving the relay optical system 17 so that the numerical values in the parentheses in the column of "eccentricity" are attained. Thus, the view angle for observation can be changed over from 50° to 30°.

FIGS. 9A–9E graphically show aberration at a view angle of 50° in the optical system having the above-described arrangement, and FIGS. 10A–10E graphically shows aberration at a view angle of 30°. It should be noted that only lateral aberration is shown in these figures because the optical system in this example has a complicated decentering structure.

The values in the above-described conditions are as follows:

$R = 1.86$ $f/L_r=0.22$             $\beta_{z2}=1.0$ $\Delta L/L_r=0.14$         $v_I-v_{II}=37.5$ $\beta_{z1}=1.9$

Example 1

| Surface No. | Radius of curvature | Surface separation | Refractive index | Abbe's No. |
|---|---|---|---|---|
| 0 | (1) (exit pupil) | $d_0 = 15.000$ | | |
| 1 | $r_1 = 149.677$ | $d_1 = 3.000$ | $n_1 = 1.7150$ | $v_1 = 45.1$ |
| 2 | $r_2 = -178.216$ | $d_2 = 0.500$ | | |
| 3 | $r_3 = \infty$ | $d_3 = 15.000$ | $n_2 = 1.5163$ | $v_2 = 64.1$ |
| 4 | $r_4 = \infty$ | $d_4 = -17.000$ | $n_3 = 1.5163$ | $v_3 = 64.1$ |
| 5 | $r_5 = 75.000$ | $d_5 = -0.500$ | | |
| 6 | $r_6 = 1011.564$ | $d_6 = -0.815$ | $n_4 = 1.7618$ | $v_4 = 26.6$ |
| 7 | $r_7 = -116.617$ | $d_7 = -5.000$ | $n_5 = 1.5748$ | $v_5 = 62.9$ |
| 8 | $r_8 = 116.254$ | $d_8 = 5.000$ | $n_6 = 1.7618$ | $v_6 = 26.6$ |
| 9 | $r_9 = -116.617$ | $d_9 = 0.815$ | $n_7 = 1.7618$ | $v_7 = 26.6$ |
| 10 | $r_{10} = 1011.564$ | $d_{10} = 0.500$ | | |
| 11 | $r_{11} = 75.000$ | $d_{11} = 28.000$ | $n_8 = 1.5163$ | $v_8 = 64.1$ |
| 12 | $r_{12} = \infty$ | $d_{12} = 13.000$ | | |
| 13 | $r_{13} = -22.386$ | $d_{13} = 12.000$ | $n_9 = 1.7440$ | $v_9 = 44.7$ |
| 14 | $r_{14} = -22.692$ | $d_{14} = 10.000$ | | |
| 15 | $r_{15} = \infty$ | $d_{15} = -35.881$ (−8.419) | | |
| 16 | $r_{16} = -16.490$ | $d_{16} = -6.083$ | $n_{10} = 1.6441$ | $v_{10} = 48.4$ |
| 17 | $r_{17} = 19.392$ | $d_{17} = -13.000$ | $n_{11} = 1.7215$ | $v_{11} = 29.1$ |
| 18 | $r_{18} = 139.272$ | $d_{18} = -6.925$ | | |
| 19 | $r_{19} = 11.589$ | $d_{19} = -5.449$ | $n_{12} = 1.7448$ | $v_{12} = 42.8$ |
| 20 | $r_{20} = -19.833$ | $d_{20} = -9.078$ | $n_{13} = 1.4870$ | $v_{13} = 70.4$ |
| 21 | $r_{21} = 19.568$ | $d_{21} = -0.100$ | | |
| 22 | $r_{22} = -46.545$ | $d_{22} = -8.418$ | $n_{14} = 1.5745$ | $v_{14} = 42.3$ |
| 23 | $r_{23} = 49.607$ | $d_{23} = -36.069$ (−63.532) | | |
| 24 | (5) (display device) | | | |

Example 2

| Surface No. | Radius of curvature | Surface separation | Refractive index | Abbe's No. |
|---|---|---|---|---|
| 0 | (5) (display device) | $d_0 = 25.720$ | | |
| 1 | $r_1 = -343.355$ | $d_1 = 6.000$ | $n_1 = 1.6968$ | $v_1 = 56.5$ |
| 2 | $r_2 = -43.237$ | $d_2 = 23.346$ (49.575) | | |
| 3 | $r_3 = 28.365$ | $d_3 = 10.000$ | $n_2 = 1.6968$ | $v_2 = 56.5$ |
| 4 | $r_4 = -115.021$ | $d_4 = 8.429$ | | |
| 5 | $r_5 = -29.549$ | $d_5 = 5.000$ | $n_3 = 1.5487$ | $v_3 = 45.6$ |
| 6 | $r_6 = 13.535$ | $d_6 = 13.180$ | | |
| 7 | $r_7 = 200.000$ | $d_7 = 18.145$ | $n_4 = 1.6968$ | $v_4 = 56.5$ |
| 8 | $r_8 = -27.430$ | $d_8 = 26.329$ (0.100) | | |
| 9 | $r_9 = 176.339$ | $d_9 = 3.000$ | $n_5 = 1.6398$ | $v_5 = 34.5$ |
| 10 | $r_{10} = 24.047$ | $d_{10} = 22.000$ | $n_6 = 1.5163$ | $v_6 = 64.1$ |
| 11 | $r_{11} = -50.384$ | $d_{11} = 51.008$ | | |
| 12 | (first image) | | | |

Example 3

| Surface No. | Radius of curvature | Surface separation | Refractive index (Eccentricity) | Abbe's No. (Inclination angle) |
|---|---|---|---|---|
| 1 | (1) (exit pupil) | 46.398 | | |
| 2 | (16) $R_y$ −79.876<br>$R_x$ −55.948<br>$K_y$ −0.833484<br>$K_x$ −4.339571<br>AR −0.169730 × 10$^{-5}$<br>BR 0.191765 × 10$^{-9}$<br>AP −0.195091<br>BP −0.367518 | 0 | | Y: −28.908 |

-continued

| Surface No. | Radius of curvature | Surface separation | Refractive index (Eccentricity) | Abbe's No. (Inclination angle) |
|---|---|---|---|---|
| 3 | (18) $R_y$ −24.621<br>$R_x$ −49.801<br>$K_y$ 0.134142<br>$K_x$ −4.272420<br>AR −0.708880 × $10^{-7}$<br>BR 0.564608 × $10^{-12}$<br>AP 0.525884 × $10^{+1}$<br>BP 0.451874 × $10^{+2}$ | 0 | n = 1.6204<br>Y: −39.532<br>Z: 14.664 | ν = 60.3<br>−10.549° |
| 4 | $R_y$ −6.478<br>$R_x$ −21.319<br>$K_y$ −0.825173<br>$K_x$ −2.696884<br>AR 0.297414 × $10^{-4}$<br>BR 0.593609 × $10^{-7}$<br>AP 0.100676 × $10^{+1}$<br>BP 0.967084 | 0 | Y: −45.655<br>Z: 0.421 | 4.151° |
| 5 | $(r_1)$ −32.567 | $(d_1)$ −10.312 | $n_1$ = 1.5163<br>Y: −47.668<br>(−40.564)<br>Z: −19.476<br>(−7.163) | $\nu_1$ = 64.1<br>40.250° |
| 6 | $(r_2)$ 15.342 | $(d_2)$ −1.000 | $n_2$ = 1.7487 | $\nu_2$ = 35.3 |
| 7 | $(r_3)$ 36.987 | $(d_3)$ −1.656 | | |
| 8 | $(r_4)$ −22.469 | $(d_4)$ −1.000 | $n_3$ = 1.7618 | $\nu_3$ = 26.6 |
| 9 | $(r_5)$ −12.446 | $(d_5)$ −10.000 | $n_4$ = 1.5163 | $\nu_4$ = 64.1 |
| 10 | $(r_6)$ 39.504 | $(d_6)$ −9.731 | | |
| 11 | $(r_7)$ −44.876 | $(d_7)$ −6.000 | $n_5$ = 1.7440 | $\nu_5$ = 44.7 |
| 12 | $(r_8)$ 125.558 | | | |
| 13 | (9) (display device) | | Y: −78.557<br>Z: −66.509 | 38.832° |

Figure 11A:
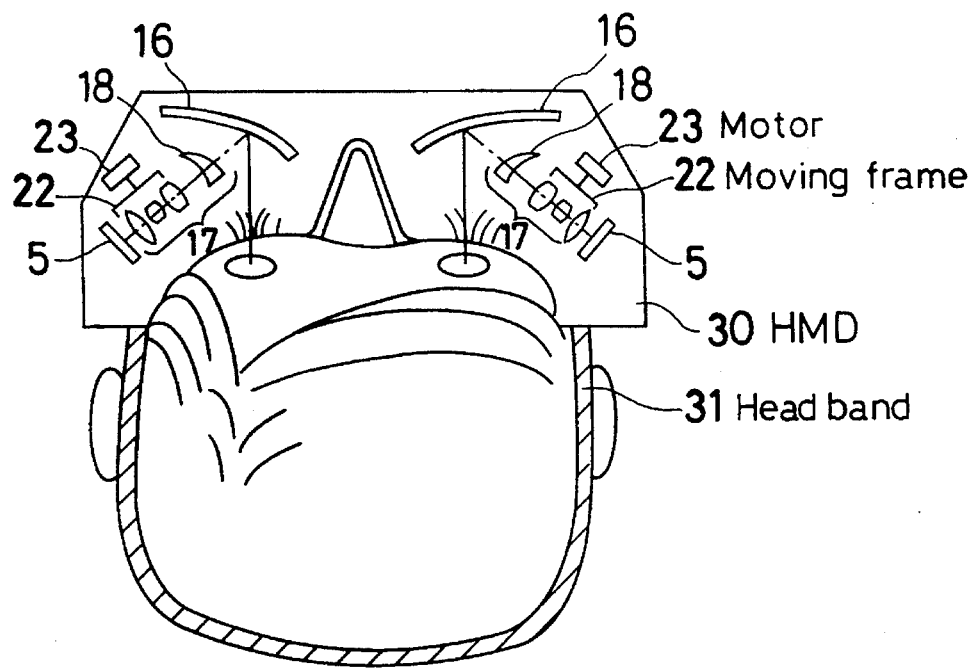
FIG. 11(A) is a sectional view of the visual display apparatus according to the present invention when it is used as a head-mounted visual display apparatus.
Figure 11B:
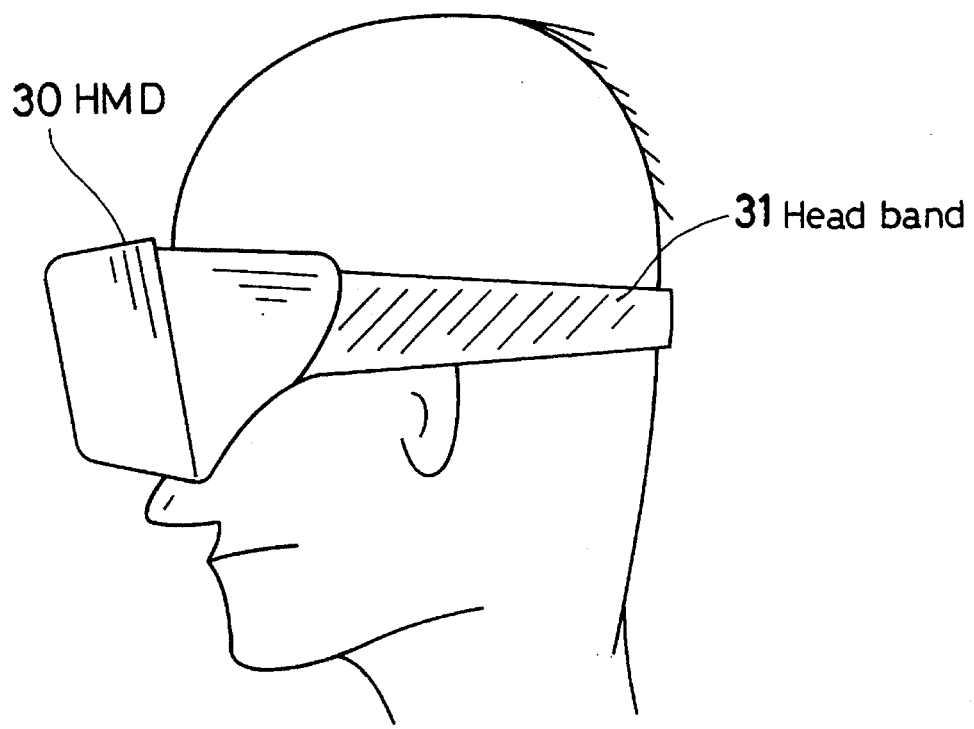
FIG. 11(B) is a perspective view of the visual display apparatus according to the present invention when it is used as a head-mounted visual display apparatus.
Figure 12:
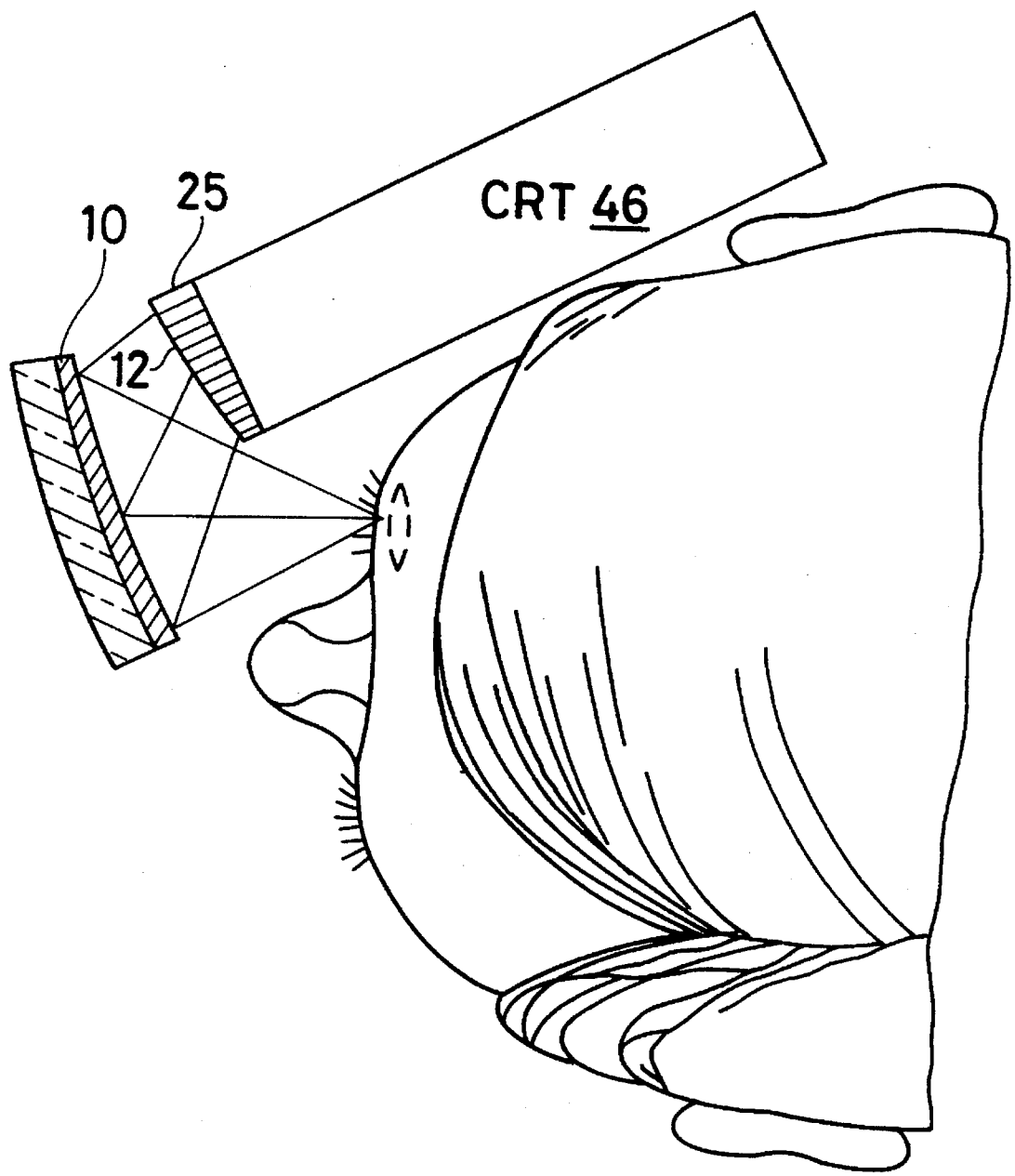
FIG. 12 schematically shows the arrangement of a conventional head-mounted visual display apparatus.

The visual display apparatus of the present invention, when used as a head-mounted visual display apparatus (HMD) 30, is mounted on the observer's head with a head band 31, for example, attached to the apparatus, as shown in a sectional view in FIG. 11(A) and also in a perspective view in FIG. 11(B). It should be noted that the arrangement shown in FIGS. 11A and 11B uses the optical system of the third example. A combination of a two-dimensional display device 5, a relay optical system 17 and an ocular optical system 16 is provided for each of the observer's left and right eyes. In each of the left and right relay optical systems 17, the movable lens units (i.e., the 2-nd to 4-th lens units 19 to 21) are integrally attached to a moving frame 22 and moved along the optical axis by a driving device, e.g., a motor 23, such that the left and right movable lens units move in association with each other, thereby effecting a change of magnification.

As will be clear from the foregoing description, the present invention provides a visual display apparatus having a device for displaying an image, a relay optical system for projecting the image displayed on the image display device to form a first image, and an ocular optical system for projecting the first image in an observer's eyeball, wherein the relay optical system has an optical system which is movable along an optical axis and enables the magnification to be changed between two different levels by moving the movable optical system. Thus, the projection magnification with which an observation image is projected to form a first image can be appropriately set by moving the movable optical system so that one magnification thereof is β, and the other magnification thereof is approximately 1/β. Accordingly, it is possible to realize an observation view angle varying device with an extremely simple structure.

What we claim is:

1. A visual display apparatus having a device for displaying an image;

a relay optical system for projecting the image displayed by said image display device to form a first image; and an ocular optical system for projecting said first image in an observer's eyeball, wherein said relay optical system has an optical system which is movable along an optical axis and enables a magnification to be changed between two different levels with an image position fixed by moving said movable optical system, wherein when one of said two different levels of magnification is assumed to be β, the other magnification is approximately 1/β; and wherein said relay optical system has an optical member of positive power which satisfies the following condition:

$$1.1 < R < 2.25$$

where R is a ratio of two magnifications which are changeable from one to the other by movement of said relay optical system; $R = \beta_1/\beta_2$, where $\beta_1$ is a higher magnification and $\beta_2$ is a lower magnification.

2. A visual display apparatus having a device for displaying an image, a relay optical system for projecting the image displayed by said image display device to form a first image, and an ocular optical system for forming an exit pupil for projecting said first image in an observer's eye, wherein a change of magnification is effected by movement of said relay optical system along an optical axis, and wherein the apparatus satisfies the following conditions:

$$0.2 < f_r/L_r < 0.6$$

$$0.1 < \Delta L/L_r < 0.4$$

where $L_r$ is the optical path length of said relay optical system, $\Delta L$ is the amount of movement of said relay optical system for effecting a change of magnification, and $f_i$ is the focal length of said relay optical system that moves to effect a magnification change.

3. A visual display apparatus having a device for displaying an image, a relay optical system for projecting the image displayed by said image display device to form a first image, and an ocular optical system for forming an exit pupil for projecting said first image in an observer's eye, wherein a change of magnification is effected by movement of said relay optical system along an optical axis, and wherein said relay optical system has at least a cemented lens which satisfies the following condition:

$$v_I - v_{II} > 20$$

where $v_I$ and $v_{II}$ are the Abbe's numbers of lens elements constituting said cemented lens.

4. A visual display apparatus having a device for displaying an image;

a relay optical system for projecting the image displayed by said image display device to form a first image; and an ocular optical system for projecting and first image in an observer's eyeball, wherein said relay optical system has an optical system which is movable along an optical axis and enables a magnification to be changed between two different levels with an image position fixed by moving said movable optical system, wherein when one of said two different levels of magnification is assumed to be β, the other magnification is approximately 1/β; and wherein said ocular optical system has a prism with a cemented surface.

5. A visual display apparatus having a device for displaying an image, a relay optical system for projecting the image displayed by said image display device to form a first image, and an ocular optical system for forming an exit pupil for projecting said first image in an observer's eye, wherein said relay optical system includes a plurality of lens units, and a change of magnification is effected by moving at least one of said lens units along an optical axis; and wherein said visual display apparatus satisfies the following conditions:

$$0.2 < f_i/L_r < 0.6$$

$$0.1 < \Delta L/L_r < 0.4$$

where $L_r$ is the optical path length of said relay optical system, $\Delta L$ is the amount of movement of said relay optical system for effecting a change of magnification, and $f_i$ is the focal length of said relay optical system that moves to effect a magnification change.

6. A visual display apparatus including:

a face-mounted unit having a device for displaying an image, a relay optical system for projecting the image displayed by said image display device to form a first image, an ocular optical system for forming an exit pupil for projecting said first image in an observer's eye, and a support member for retaining said face-mounted unit on an observer's head, wherein said relay optical system has a movable lens unit and a fixed lens unit, and a change of magnification is effected by movement of said movable lens unit along an optical axis; and wherein said visual display apparatus satisfies the following conditions:

$$0.2 < f_i/L_r < 0.6$$

$$0.1 < \Delta L/L_r < 0.4$$

where $L_r$ is the optical path length of said relay optical system, $\Delta L$ is the amount of movement of said relay optical system for effecting a change of magnification, and $f_i$ is the focal length of said relay optical system that moves to effect a magnification change.

7. A visual display apparatus having a device for displaying an image, a relay optical system for projecting the image displayed by said image display device to form a first image, and an ocular optical system for projecting said first image in an observer's eye, wherein said relay optical system includes an optical system movable along an optical axis and that enables magnification to be changed between two different levels by moving said movable optical system, wherein when one of the magnifications of said movable optical system is assumed to be β, the second magnification is approximately 1/β, and wherein said visual display apparatus satisfies the following conditions:

$$0.2 < f_i/L_r < 0.6$$

$$0.1 < \Delta L/L_r < 0.4$$

where $L_r$ is the optical path length of said relay optical system, $\Delta L$ is the amount of movement of said relay optical system for effecting a change of magnification, and $f_i$ is the focal length of said relay optical system that moves to effect a magnification change.

8. A visual display apparatus having a device for displaying an image, a relay optical system for projecting the image displayed by said image display device to form a first image, and an ocular optical system for forming an exit pupil for projecting said first image in an observer's eye, wherein said relay optical system includes a plurality of lens units, and a change of magnification is effected by moving at least one of said lens units along an optical axis; and wherein said relay optical system has at least a cemented lens which satisfies the following condition:

$$v_I - v_{II} > 20$$

where $v_I$ and $v_{II}$ are the Abbe's numbers of lens elements constituting said cemented lens.

9. A visual display apparatus including:

a face-mounted unit having a device for displaying an image, a relay optical system for projecting the image displayed by said image display device to form a first image, an ocular optical system for forming an exit pupil for projecting said first image in an observer's eye, and a support member for retaining said face-mounted unit on an observer's head, wherein said relay optical system has a movable lens unit and a fixed lens unit, and a change of magnification is effected by movement of said movable lens unit along an optical axis; and wherein said relay optical system has at least a cemented lens which satisfies the following condition:

$$\nu_I - \nu_{II} > 20$$

where $\nu_I$ and $\nu_{II}$ are the Abbe's numbers of lens elements constituting said cemented lens.

10. A visual display apparatus having a device for displaying an image, a relay optical system for projecting the image displayed by said image display device to form a first image, and an ocular optical system for projecting said first image in an observer's eye, wherein said relay optical system includes an optical system movable along an optical axis and that enables magnification to be changed between two different levels by moving said movable optical system, wherein when one of the magnifications of said movable optical system is assumed to be $\beta$, the second magnification is approximately $1/\beta$, and wherein said relay optical system has at least a cemented lens which satisfies the following condition:

$$\nu_I - \nu_{II} > 20$$

where $\nu_I$ and $\nu_{II}$ are the Abbe's numbers of lens elements constituting said cemented lens.

11. A visual display apparatus having a device for displaying an image;

a relay optical system for projecting the image displayed by said image display device to form a first image; and an ocular optical system for projecting said first image in an observer's eyeball, wherein said relay optical system has an optical system which is movable along an optical axis and enables a magnification to be changed between two different levels by moving said movable optical system, wherein when one of magnifications of said movable optical system is assumed to be $\beta$, the other magnification is approximately $1/\beta$, and wherein said relay optical system has an optical member of positive power which satisfies the following condition:

$$1.1 < R < 2.25$$

where R is a ratio of two magnifications which are changeable from one to the other by movement of said relay optical system; $R = \beta_1/\beta_2$, where $\beta_1$ is a higher magnification, and $\beta_2$ is a lower magnification.

12. A visual display apparatus having a device for displaying an image;

a relay optical system for projecting the image displayed by said image display device to form a first image; and an ocular optical system for projecting said first image in an observer's eyeball, wherein said relay optical system has an optical system which is movable along an optical axis and enables a magnification to be changed between two different levels by moving said movable optical system, wherein when one of magnifications of said movable optical system is assumed to be $\beta$, the other magnification is approximately $1/\beta$, and wherein said ocular system has a prism with a cemented surface.

* * * * *